(12) United States Patent
Plocher et al.

(10) Patent No.: US 6,279,992 B1
(45) Date of Patent: Aug. 28, 2001

(54) FOLDING TABLE FOR FITTING TO THE REAR SIDE OF THE BACK OF A SEAT IN A MOTOR-COACH OR AN AIRCRAFT

(75) Inventors: Bernd Plocher, Rottenburg-Seebronn; Stefan Kuehn, Neubulach; Andre Hein, Herrenberg; Michael Keller, Freudenstadt; Soeren Groth, Herrenberg; Monika Jessberger, Neu-Ulm; Franz Kriegelsteiner, Illerkirchberg, all of (DE)

(73) Assignees: Fischerwerke Artur Fischer GmbH & Co. KG, Waldachtal; Evobus GmbH, Stuttgart, both of (DE)

( * ) Notice: Subject to any disclaimer, the term of this patent is extended or adjusted under 35 U.S.C. 154(b) by 0 days.

(21) Appl. No.: 09/358,295
(22) Filed: Jul. 21, 1999

(30) Foreign Application Priority Data

Jul. 28, 1998 (DE) .............................. 198 33 888

(51) Int. Cl.$^7$ ........................................... A47B 1/00
(52) U.S. Cl. .................. 297/146; 297/163; 297/188.07; 108/44
(58) Field of Search .................................. 297/146, 163, 297/188.04, 188.07, 173; 108/44

(56) References Cited

U.S. PATENT DOCUMENTS

| 3,773,381 | * | 11/1973 | Brennan | 297/163 |
| 5,092,652 | * | 3/1992 | Macaluso | 297/163 X |
| 5,876,092 | * | 3/1999 | An | 297/146 |
| 5,984,347 | * | 11/1999 | Blanc-Rosset | 297/146 |
| 6,085,666 | * | 7/2000 | Anderson et al. | 108/44 X |

* cited by examiner

Primary Examiner—Anthony D. Barfield
(74) Attorney, Agent, or Firm—Michael J. Striker

(57) ABSTRACT

A folding table for fitting to a rear side of a back of a seat in a motor-coach or an aircraft has a folding table element, pivotal articulation means formed so that the folding table element is pivotable back and forth between an out-of-use position in which the folding table element lyes substantially flat against a rear side of a back of a seat and an in-use position in which the folding table element projects approximately horizontally from the rear side of the back of the seat, a holder provided for holding a drink container and movably connected to the holding table element, a guide connecting the holder with the holding table element so that the holder, when the folding table element is in the in-use position is movable back and forth between an out-of-use position in which the holder is stowed in the holding table element, and an in-use position in which a drink container can be placed into the holder.

11 Claims, 8 Drawing Sheets

FOLDING TABLE FOR FITTING TO THE REAR SIDE OF THE BACK OF A SEAT IN A MOTOR-COACH OR AN AIRCRAFT

BACKGROUND OF THE INVENTION

The present invention relates to a folding table for fitting to the rear side of the back of a seat in a motor-coach or an aircraft.

Folding tables of that type are known per se. They are arranged on the rear side of the back of a seat by means of a pivotal articulation. The known folding tables can be pivoted from an out-of-use position, in which they lie substantially flat against the rear side of the seat back, into an in-use position, in which they project approximately horizontally from the rear side of the seat back, and vice versa. It is also known to construct such a folding table with a recess, for example a circular recess, into which a drink container, such as a drink can, a cup or a breaker, can be placed. The recess stops the drink container placed therein from slipping, but does not prevent container from falling over.

SUMMARY OF THE INVENTION

Accordingly, it is an object of the present invention to develop a folding table for fitting to the rear side of the back of a seat in a motor-coach or an aircraft, which avoids the disadvantages of the prior art.

It is another object of present invention to provide a folding table of this type which is formed so that it stops a drink container placed therein from falling over.

The folding table according to the invention has a holder which is movably connected to the folding table by way of a guide. In an out-of-use position, the holder is stowed in the folding table so that the holder does not project from the folding table, as a result of which the entire surface of the folding table can be used and the holder does not hinder pivoting of the folding table into the out-of-use position. When the folding table is in the in-use position, the holder can be moved out of the folding table so that a drink container can be placed into the holder. The folding table according to the invention has the advantage that its holder for a drinks container does not occupy any additional space in the out-of-use position and, in the in-use position, stops a drink container placed therein from falling over.

In an embodiment of the invention, a sliding guide is provided, by means of which the holder is fastened to the folding table. By means of the sliding guide, the holder can be pulled out of the folding table at one side and, when not in use, can be pushed back into the folding table again. This embodiment of the invention has the advantage that the holder in its in-use position occupies no space on the folding table, so that the entire surface of the folding table is available, for example, for food, and a drink container can additionally be placed in the holder pulled out at the side.

In an embodiment of the invention, a pivotal articulation is provided on the folding tables as the guide for the holder. In this embodiment of the invention, the holder can be pivoted upwards from the folding table through a limited pivoting angle. In the in-use position, the holder is located above the folding table, so that it stops a drink container placed therein, which is standing on the folding table, from falling over. This embodiment of the invention has the advantage that a drink container placed in the holder does not project downwards beneath the folding table. The drinks container is, therefore, out of the way of a passenger's legs and knees. Furthermore, this embodiment of the invention prevents the passenger from accidentally pushing the drinks container upwards out of the holder with his knee.

In a further development of the invention, the guide for the holder on the folding table is in such a form that the holder can be brought into its in-use position when the folding table is in the out-of-use position. This has the advantage that the holder for the drink container can be used independently on the folding table without the folding table having to be pivoted into its horizontal in-use position in which it restricts the freedom of movement of a passenger. Two guides can be provided, one of which serves to bring the holder for the drinks container into the in-use position when the folding table is in the in-use position. The other guide serves to bring the holder into the in-use position when the folding table is occupying the out-of-use position. Both possibilities can be realized with one guide for the holder on the folding table.

In a preferred embodiment of the invention, the guide allowing the holder to be brought into the in-use position when the folding table is in the out-of-use position is in the form of a pivotal articulation having a limited pivoting angle.

In an embodiment of the invention there is provided an opening spring element, which pivots the holder into the in-use position. A releasable locking device holds the holder in the out-of-use position against the force of the opening spring element. When the locking device is released, the holder pivots into its in-use position under the action of the spring. The pivoting movement is preferably dampened by a damping member. Pivoting of the holder into the in-use position may be carried out under the action of a spring both when the folding table is in the in-use position and when the folding table is in the out-of-use position, to which end two opening spring elements are preferably used.

In an embodiment of the invention, a support is provided, which is connected to the holder or to the folding table by way of a pivotal articulation. The support is pivotable downwards from the holder through a limited pivoting angle by means of gravity and/or the force of a spring, and it supports a drink container placed in the holder. The support is provided especially in cases where a drinks container is placed in the holder does not stand on the folding table, that is to say, for example, where the holder can be pulled out of the folding table at the side or where the holder is used with the folding table in the out-of-use position.

In order to pivot the support downwards from the holder, a spring element is provided in an embodiment of the invention. The opening spring element of the holder may be used as the spring element for the support.

In an embodiment of the invention, a safety mounting for the folding table is provided, which allows the folding table to pivot downwards from the horizontal in-use position if the folding table is overloaded. The safety arrangement serves to reduce the risk of injury to a passenger in the event of an accident; it allows the folding table to fold away downwards if the passenger, for example, hits his head against the folding table. Under a normal load, the safety mounting holds the folding table in its in-use position. The safety mounting has a stop, which limits the pivoting angle of the folding table from the out-of-use position into the approximately horizontal in-use position. The stop is surmounted by overloading of the folding table. This embodiment of the folding table according to the invention can be realized independently of the presence of the holder for a drink container on the folding table according to the invention.

In a further development of the invention, the stop is formed on the periphery of a pivot pin, about which the folding table is pivotable. The stop co-operates with a spring-operated slide and disengages the slide from the stop if the folding table is overloaded, so that the folding table pivots downwards out of its horizontal in-use position. The pivot pin may be fixed or it may rotate with the folding table.

For fastening purposes, the folding table can be provided, for example, with laterally projecting fastening pins which are inserted into complementary recesses in folding table mountings fitted to the back of the seat. In order to prevent the folding table from pivoting together with the back of the seat in the case of a seat back the angle of which can be adjusted, it is also possible for lateral struts to be provided as the folding table mountings, which struts are fastened to a fixed part of the seat or to the floor of the vehicle and therefore do not pivot with the seat back. In order that the horizontal in-use position of the folding table does not have to be adjusted, an embodiment provides an adapter which guarantees the horizontal in-use position by means of an interlocking connection both at the folding table and at the folding table mounting. By the use of different adapters, the folding table can be adapted to different folding table mountings, especially to folding table mountings fitted at different angles. This embodiment of the invention has the advantage that the folding table merely has to be inserted into the folding table mountings and the horizontal in-use position is already determined as a result of the insertion into the folding table mountings and does not first have to be set.

The interlocking connection can be achieved, for example, by means of an irregular polygonal section or tooth profile, by means of an inwardly or outwardly projecting nose or the like. In an embodiment of the invention, the adapter is in the form of an adapter ring having an inner and outer profile establishing a definite angular position.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
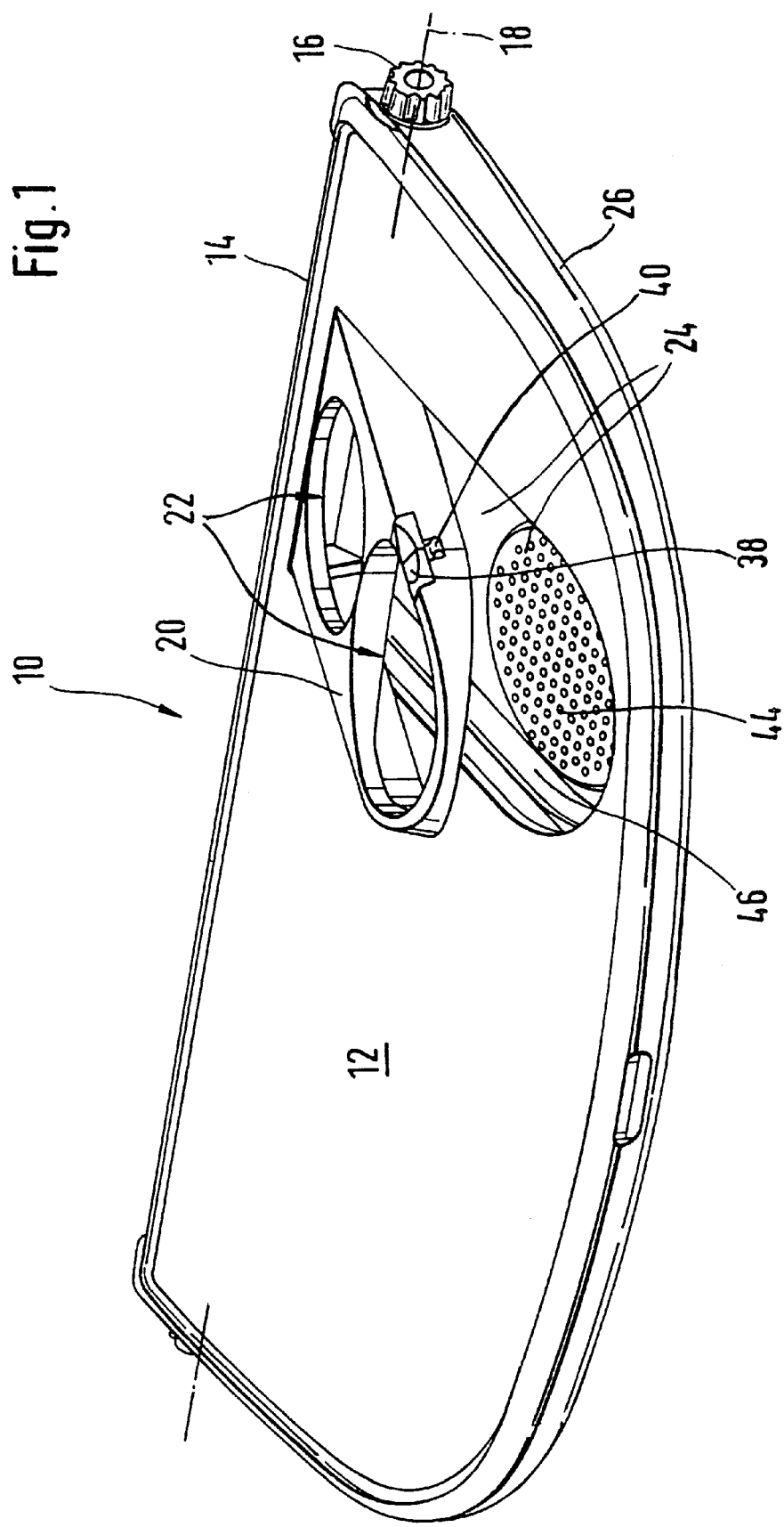
FIG. 1 shows a folding table according to the invention in an in-use position.

FIG. 1 shows a folding table 10 according to the invention in an in-use position in which it projects horizontally from the rear side of the back (not shown) of a seat in a motor-coach or an aircraft. The folding table 10 is composed of injection-molded plastic parts; it has a support surface 12.

For fitting to the seat back, shaped fastening pins 16 project laterally close to a leading edge 14 of the folding table 10, which fastening pins 16 can be inserted, non-rotatably, with interlocking connection, into complementary recesses (not shown) provided on the rear side of the seat back (not shown). The fastening pins 16 are mounted in the folding table 10 to be pivotable through a limited pivoting angle; they define a horizontal pivotal axis 18 close to the leading edge 14 of the folding table 10, parallel to which the pivotal axis 18 extends.

A holder 20, into which a drinks container (not shown), such as, for example, a beaker, a cup or a drinks can, can be placed, is let into the folding table 10 in the right-hand region. The holder 20 is in the form of a plate and, when viewed from above, is semi-oval in shape, a semi-circular side of the semi-oval being remote from the leading edge 14 of the folding table 10.

The holder 20 is mounted in the folding table 10 to be pivotable about an axis which is in alignment with the pivotal axis 18 of the folding table 10. In its in-use position, the holder 20 projects obliquely upwards out of the folding table 10. The holder 20 has two circular openings 22 for two drinks containers. The drinks containers placed therein stand on a support surface 24 let into the folding table 10. When it is not in use, the holder 20 can be pivoted into a stowed out-of-use position in the folding table 10, in which position the holder 20 is flush with the receiving surface 12 of the folding table 10.

Figure 2:
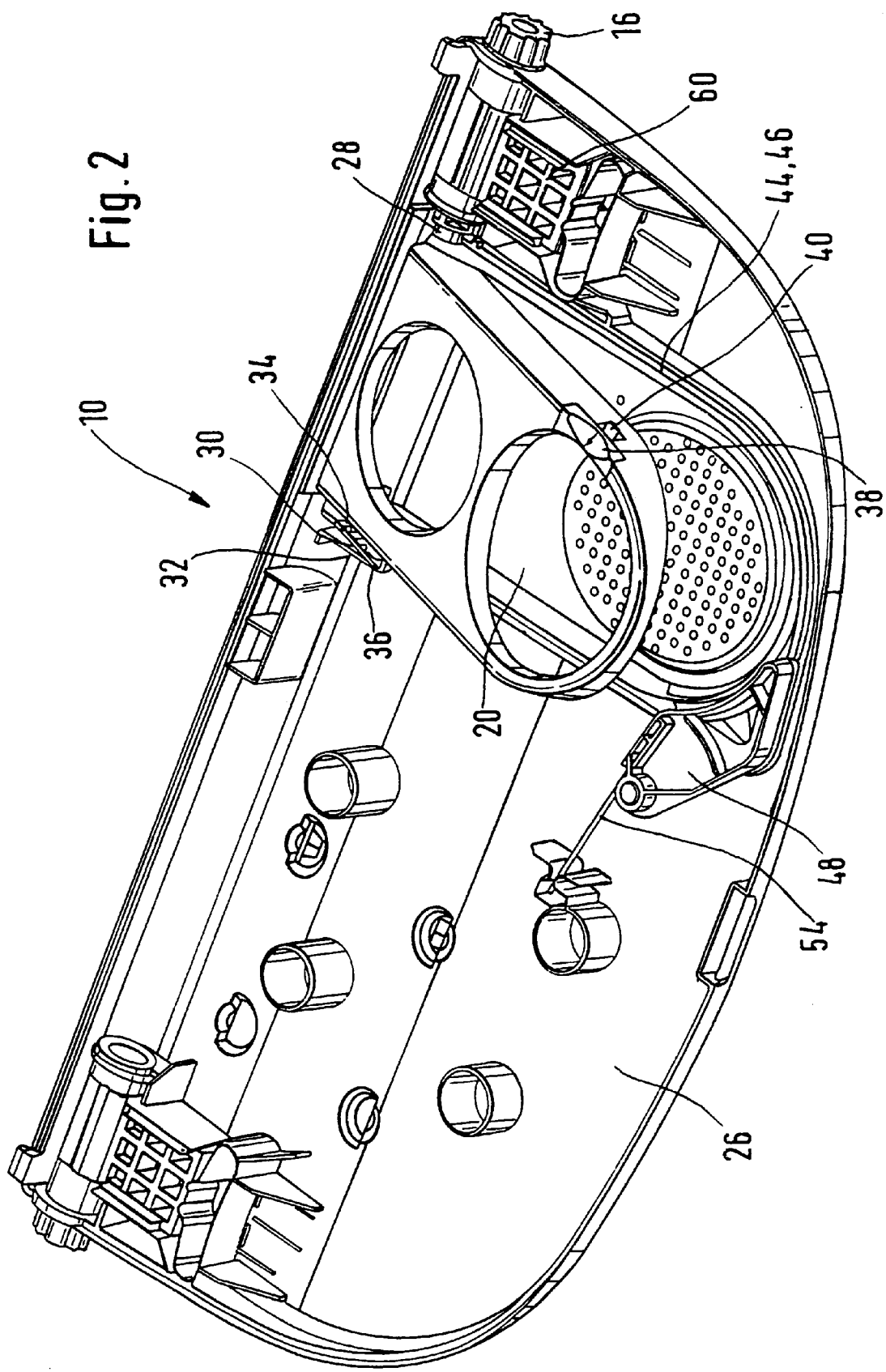
FIG. 2 shows a lower part of the folding table of FIG. 1.

The folding table 10 is produced as two shells forming an upper part, comprising the receiving surface 12, and a lower part. FIG. 2 shows the folding table 10 without the upper part, so that the lower part 26 of the folding table 10, in which the holder 20 and the fastening pins 16 are pivotally mounted, is visible. The holder 20 is mounted in the folding table 10 by means of a pivot pin connection 28. The pivot pin connection 28 has two bearing pins which project laterally from the holder 20 and engage in complementary bearing apertures in the lower part 26 of the folding table 10. A laterally arranged bent spring 30, which is supported on the lower part 26 of the folding table 10, pushes the holder 20 into its in-use position in which it projects obliquely upwards. The pivoting movement of the holder 20 is dampened by a rotary damping member 32, the toothed wheel of which meshes with a toothed wheel segment 34 which is fixed to one side of the holder 20 and is integral therewith. The rotary damping member 32 is inserted, non-rotatably, into a recess 36 in the lower part 26 of the folding table 10.

A locking device 38, 40 holds the holder 20 in the stowed out-of-use position in the folding table 10, as shown in FIG. 2, against the force of the leg spring 30. The locking device 38, 40 comprises a button 38 arranged on the lateral edge of the holder 20 at a distance from the pivot pin connection 28. The button 38 is integral with a locking projection 40 (FIG. 1) which projects laterally beyond the holder 20 and, when the holder 20 is in the out-of-use position, engages beneath the receiving surface 12 of the folding table 10 and thus holds the holder 20 in the out-of-use position. By pressing on the button 38, the locking projection 40 is disengaged, so that the holder 20 pivots under the action of the spring into the in-use position in which it projects obliquely upwards. The locking projection 40 has a sloping surface on its underside, so that it automatically engages beneath the receiving surface 12 when the holder 20 is pressed down into the folding table 10.

Figure 3:
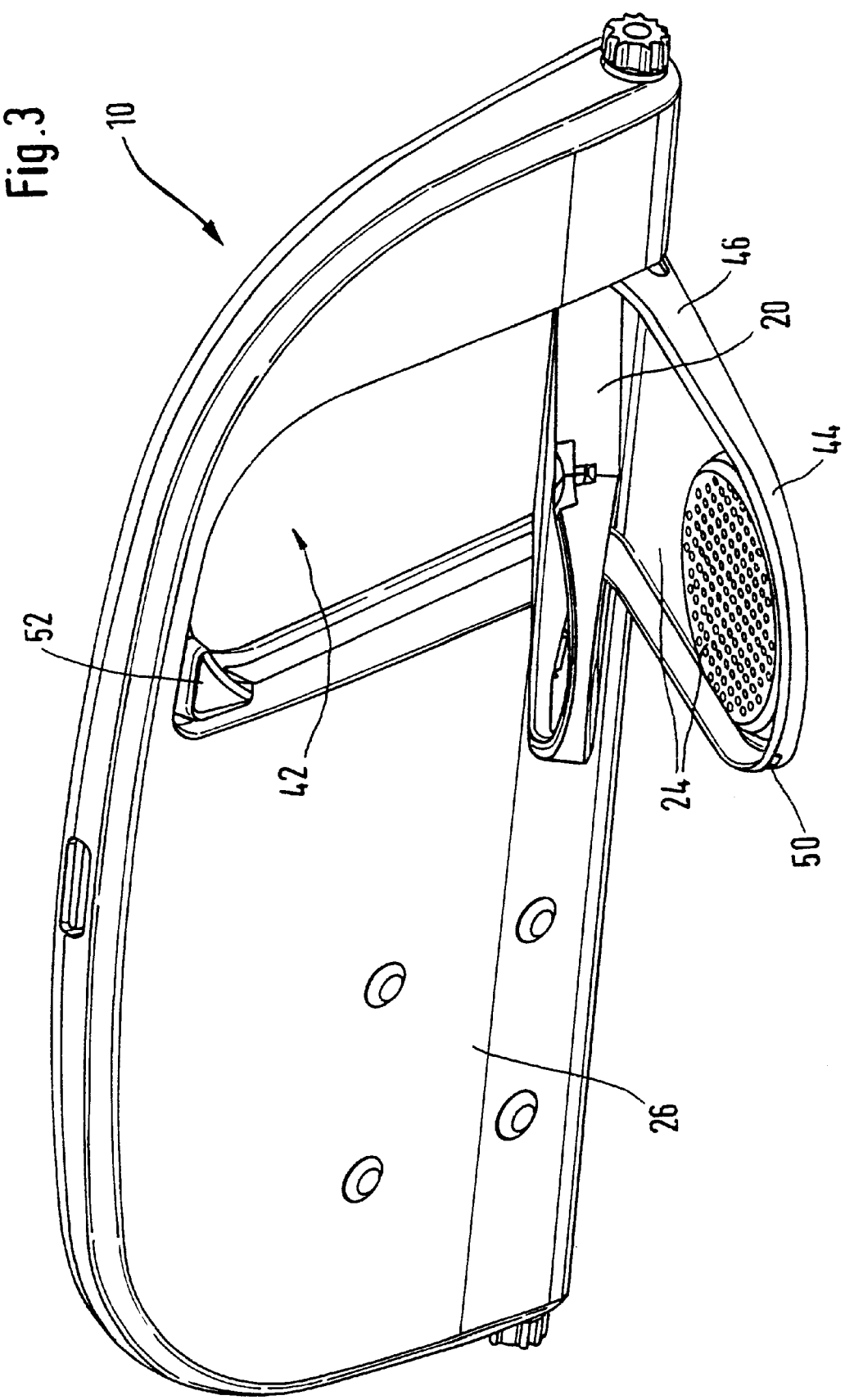
FIG. 3 shows the folding table of FIG. 1 in an out-of-use position.

FIG. 3 shows the folding table 10 in an out-of-use position in which it is pivoted upwards, in which the folding table 10 is pivoted against the rear side of the back of the seat (not shown). FIG. 3 therefore shows a view of the underside of the folding table 10.

As will be seen in FIG. 3, the holder 20 is accommodated in a recess 42 in the folding table 10 which extends from the upper side of the folding table 10 to the underside. Beneath the holder 20 there is arranged a support 44, the base of which forms the receiving surfaces 24 for drink containers placed in the holder 20. When viewed from above, the support 44, like the holder 20 is semi-oval in shape. The support 44 is constructed with an upwardly projecting edge 46 as a tray for collecting any liquid that spills from a drink container placed in the holder 20. The height of the edge 46 is smaller than the thickness of the folding table 10. When it is in the out-of-use position, the holder 20 lies in the support 44.

The support 44 is mounted in the folding table 10 about the same pivotal axis as the holder 20. For the pivot bearing, pin-receiving apertures are provided in the side wall 46 of the support 44, through which the pins of the holder 20 pass. The support 44, like the holder 20, is therefore pivotally fastened to the folding table 10 by means of the pin bearing 28 (FIG. 2).

A locking device 48, 50, 52 holds the support 44 in a stowed initial position in the folding table 10, in which the support 44 is flush with the underside of the folding table 10. The locking device comprises a pivoting bolt 48, which is pivotally mounted in the lower part 26 of the folding table 10 (FIG. 2). A projection, which is integral with the pivoting bolt 48 and is not visible in the drawing, engages in a recess 50 in the lateral edge 46 of the support 44, so that the support 44 is held in its stowed initial position in the folding table 10. By pressing on a button 52 (FIG. 3) which is integral with the pivoting bolt 48 and is arranged on the underside of the folding table 10, the pivoting bolt 48 can be disengaged from the support 44, so that the support 44 pivots out from the underside of the folding table 10 by gravity. When the folding table 10 is in the out-of-use position against the rear side of the seat back (not shown), the support 44 pivots downwards into a horizontal support position, as is shown in FIG. 3. A leg spring 54 pushes the pivoting bolt 48 into engagement with the support 44.

The leg spring 32 of the holder 20, which is supported on the support 44, pushes the holder 20 into an in-use position in which it projects obliquely upwards from the support 44. In that position, the holder 20, like the support 44, projects from the underside of the folding table 10. Therefore, when the folding table 10 is in the out-of-use position, in which the folding table 10 rests obliquely upwards against the rear side of the back of the seat (not shown), the holder 20 and the support 44 pivot out from the underside-of the folding table 10 when the pivoting bolt 48 has been released. The support 44 pivots into a horizontal support position, and the holder 20 projects obliquely upwards from the support 44, that is to say it is located above the support 44 and stops a drink container (not shown) placed in the holder 20 from falling over. As a result, the holder 20 can be used for holding one or two drinks containers both in the in-use position and in the out-of-use position of the folding table 10.

Figure 4:
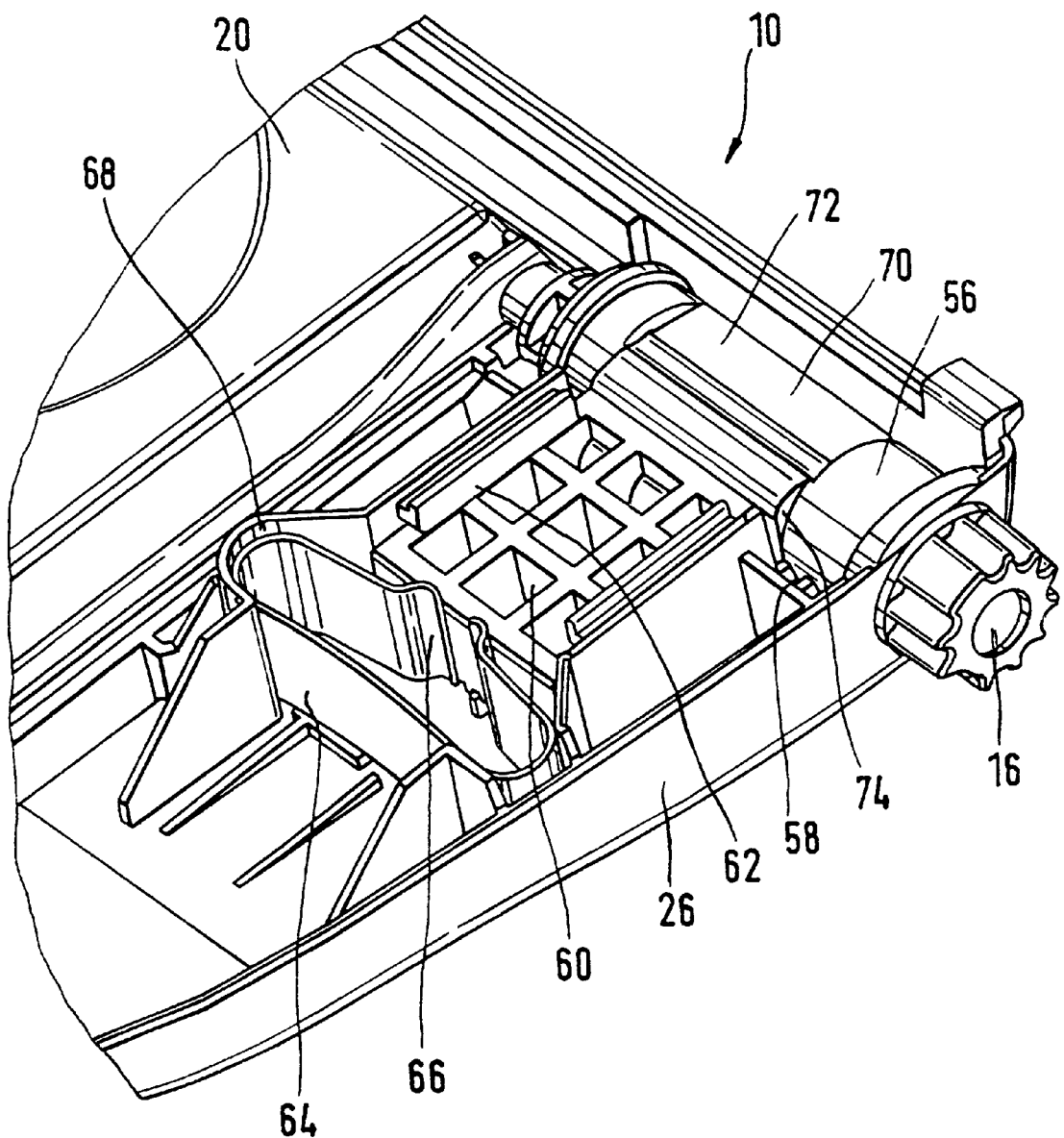
FIG. 4 shows a fastening pin of the folding table of FIG. 1 on an enlarged scale.

The fastening pins 16 which project laterally from the folding table 10 are shown on an enlarged scale in FIG. 4. They have cylindrical bearing surfaces 56, by means of which they are located in half-bearings 58 in the lower part 26 and in similar half-bearings, which are not visible, in the upper part of the folding table 10. When the part of the fastening pins 16 that projects laterally from the folding table 10 is placed in a rotationally fixed manner into recesses (not shown), the folding table 10 is pivotally mounted about the fastening pins 16.

In order to limit the pivoting angle of the folding table 10, a slide 60 is provided on each fastening pin 16 in the lower part 26 of the folding table 10. The slide 60 is guided in the folding table 10 in a slide guide 62 so that it is displaceable radially with respect to the fastening pin 16. A leaf spring 64, which has been bent to form an oval, presses with its two free ends 66 against the slide 60 and thus presses the slide 60 radially against the fastening pin 16. The doubly bent spring 64 is inserted in a recess 68 in the lower part 26 of the folding table 10.

Figure 5:
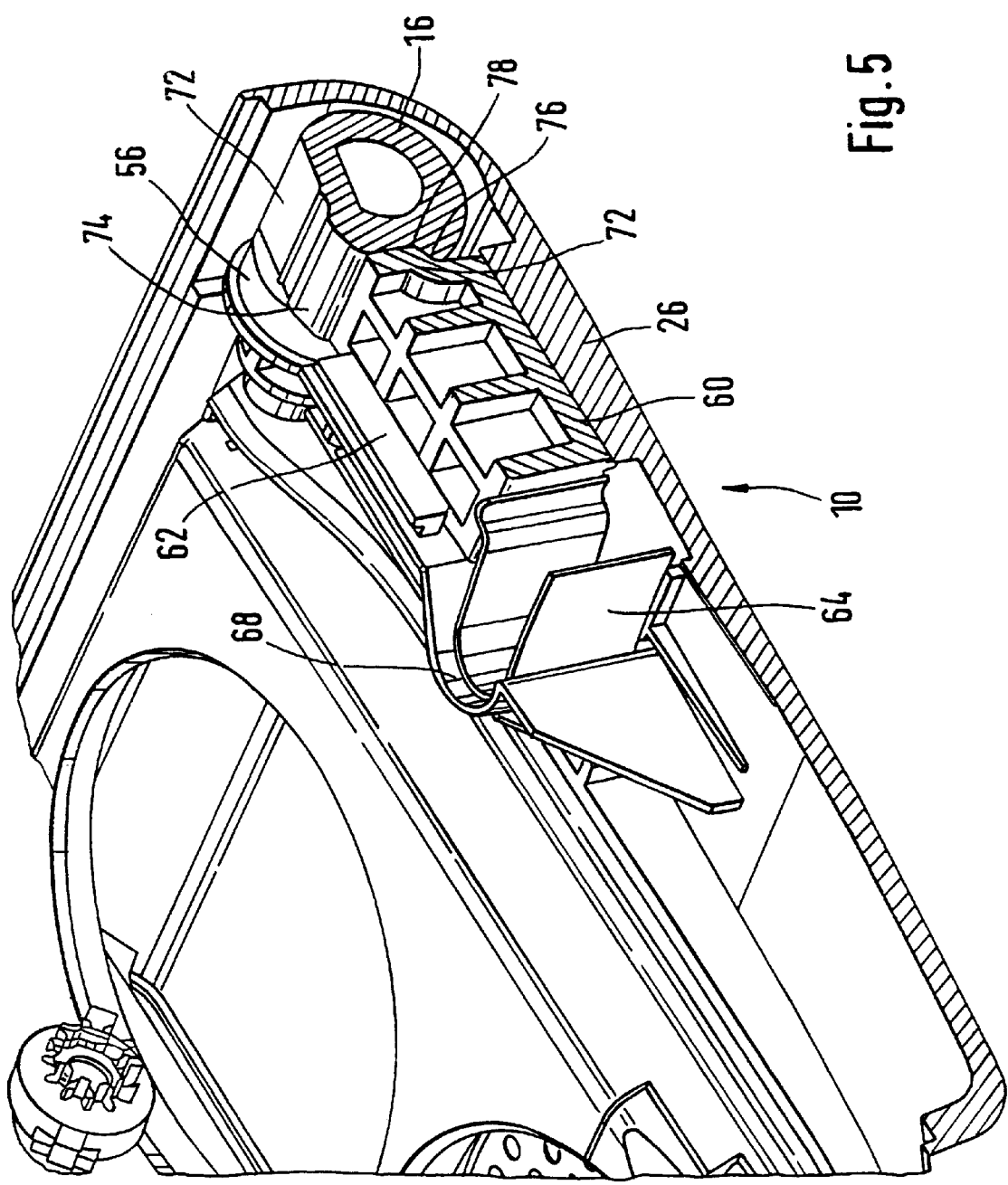
FIG. 5 shows a cross-section through the fastening pin of FIG. 4.

A middle portion 70 of the fastening pins 16 located between the cylindrical bearing surfaces 56 is non-circular in shape; the shape of that middle portion 70 can best be seen in FIG. 5, which shows a longitudinal section through the slide 60 and a radial section through the fastening pin 16 in the same cutting plane. The middle portion 70 of the fastening pin 16 has two secant surfaces 72, which are arranged approximately at right angles to each other. When the folding table 10 is in the in-use position, the slide 60 presses against one of the two secant surfaces 72, and when the folding table 10 is in the out-of-use position, the slide 60 presses against the other secant surface 72. FIGS. 4 and 5 show the in-use position of the folding table 10. In order to pivot the folding table 10 from the in-use position into the out-of-use position and vice versa, the slide 60 must surmount a thickened portion 74 which is formed between the two secant surfaces 72 on the middle portion 70 of the fastening pin 16, parallel to the axis thereof and integral therewith. As a result, the slide 60 holds the folding table 10 in the in-use and out-of-use positions.

The fastening pin 16, the slide 60 and the leaf spring 64, which presses the slide 60 in the radial direction against the fastening pin 16, form a safety mounting for the folding table 10 according to the invention. Adjacent to the secant surface 72 against which the slide 60 presses in the in-use position of the folding table 10, the fastening pin 16 has a stop 76 in the form of an outwardly projecting nose extending in a longitudinal direction of the fastening pin 16. When the folding table 10 is in the in-use position, the slide 60 rests against the stop 76 of the fastening pin 16 by means of a shoulder 78 formed on its end face. The shoulder 78 and the stop 76 limit the pivoting angle of the folding table 10 when it is folded down into the in-use position, so that the folding table 10 is horizontal. The stop 76 and the shoulder 78 are not arranged radially with respect to the fastening pin 16, but an angle to the radial. The stop 76 and the shoulder 78 therefore form sloping surfaces. This has the effect that, if the folding table 10 is overloaded, the stop 76 pushes the slide 60 away from the fastening pin 16, so that the folding table 10 pivots downwards beyond the horizontal in-use position. The sloping surfaces formed by the stop 76 and the shoulder 78 are so directed, and a spring force of the leaf spring 64 is so chosen, that the stop 76 folds away downwards only at and above a limit-value load which is considerably greater than a usual load exerted by food, drinks or other objects placed on the folding table 10. The limit-value load above which the folding table 10 folds away downwards is, for example, 13 kg. The folding table 10 folds away downwards is, for example, 13 kg. The folding table 10 folds away downwards when it is overloaded so that the folding table 10 gives away if a passenger hits the folding table 10 in the event of an accident. The risk of injury is reduced as a result.

Figure 6:
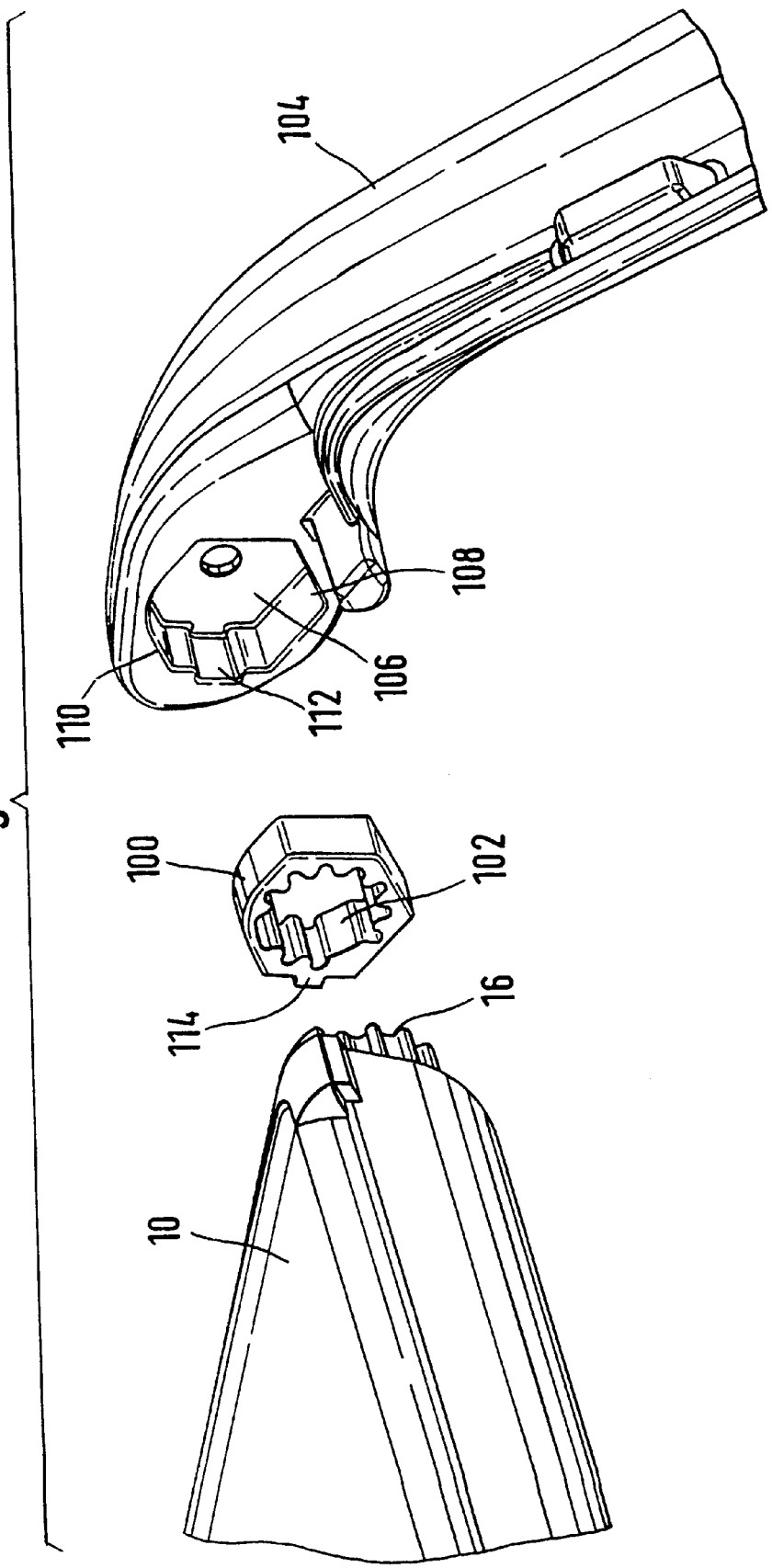
FIG. 6 shows an adapter ring for the folding table according to the invention.

For fastening purposes, the folding table 10 has two adapter rings 100 which can be placed on the lateral fastening pins 16 of the folding table 10 with an interlocking connection (FIG. 6). In the embodiment shown, the fastening pins 16 have an irregular multi-tooth profile, onto which the adapter ring 100 having a complementary multi-tooth profile 102 on its inside can be placed. The multi-tooth profiles 102 of the fastening pin 16 and of the adapter ring 100 produce the interlocking connection between the adapter ring 100 and the fastening pin 16, which establishes a definite angular position of the adapter ring 100 on the fastening pin 16.

In the embodiment shown, two holding struts 104 are provided as the mountings for the folding table, which struts 104 are arranged to the side of the folding table 10. The holding struts 104 are fastened to a fixed, lower portion of the seat (not shown) and extend obliquely upwards as far as the fastening pins 16. At the upper end, the holding struts 104 have recesses 106 into which the adapter rings 100 can be placed with an interlocking connection. The periphery of the recesses 106 has four sides 108 of a notional irregular hexagon, which are completed by a concave curved surface 110. A groove 112 is formed in one of the four sides 108 of the notional hexagon. The outer periphery of the adapter ring 100 has a shape which is complementary to that of the recess 106, an outwardly projecting pin 114 being provided for engagement into the groove 112. The shape of the recess 106 and of the outer side of the adapter ring 100 produces an interlocking connection with a definite angular position of the adapter ring 100 with respect to the holding strut 104. By means of the adapter ring 100, the angular position of the fastening pin 16 of the folding table 10 relative to the holding strut 104 is clearly fixed and the horizontal in-use position of the folding table 10 is firmly set as a result. By using an adapter 100 in which the inner profile 102 is rotated relative to the outer profile, the folding table 10 can readily be adapted to holding struts 104 at different angles.

Figure 7:
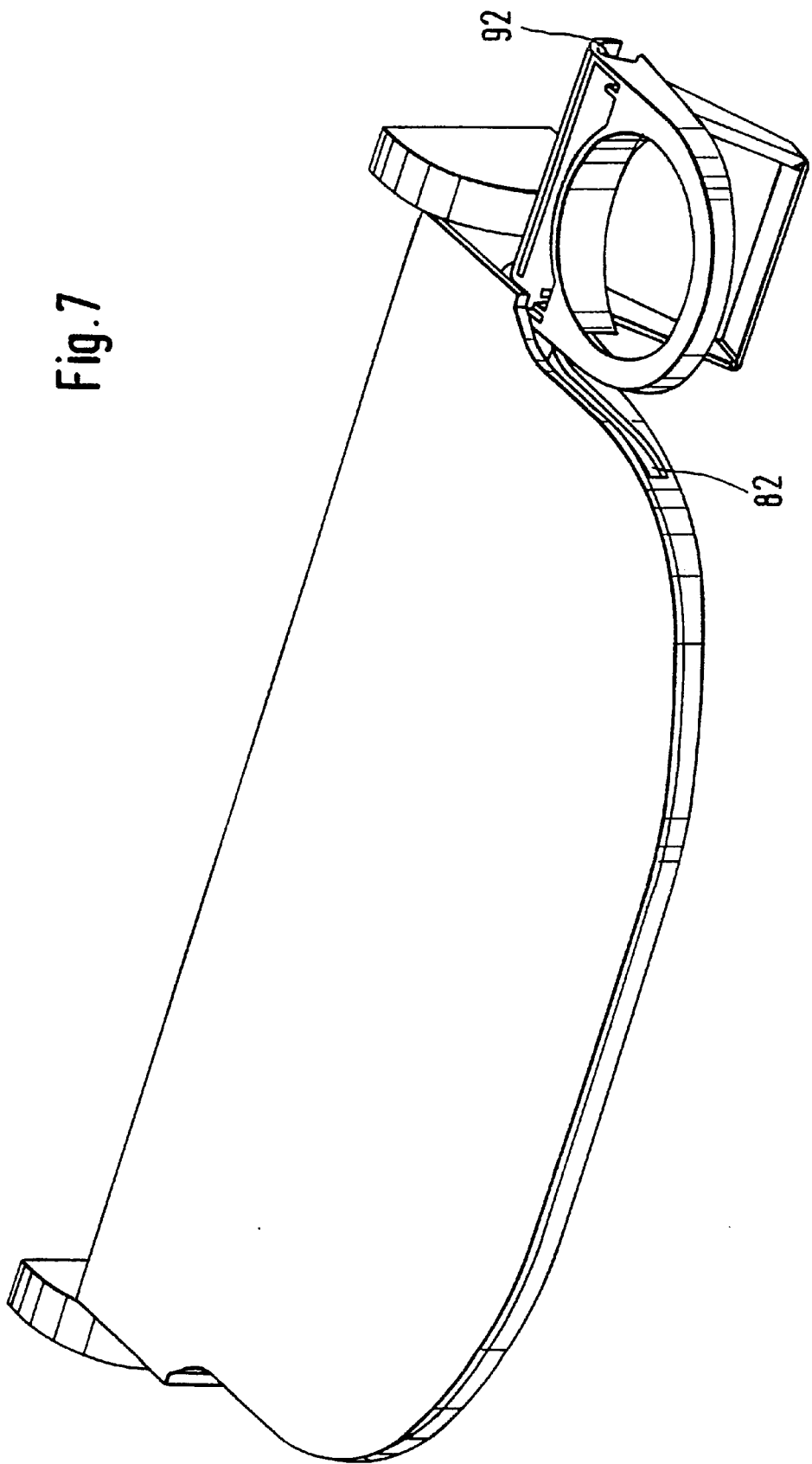
FIG. 7 shows a second embodiment of a folding table according to the invention in an in-use position.
Figure 8:
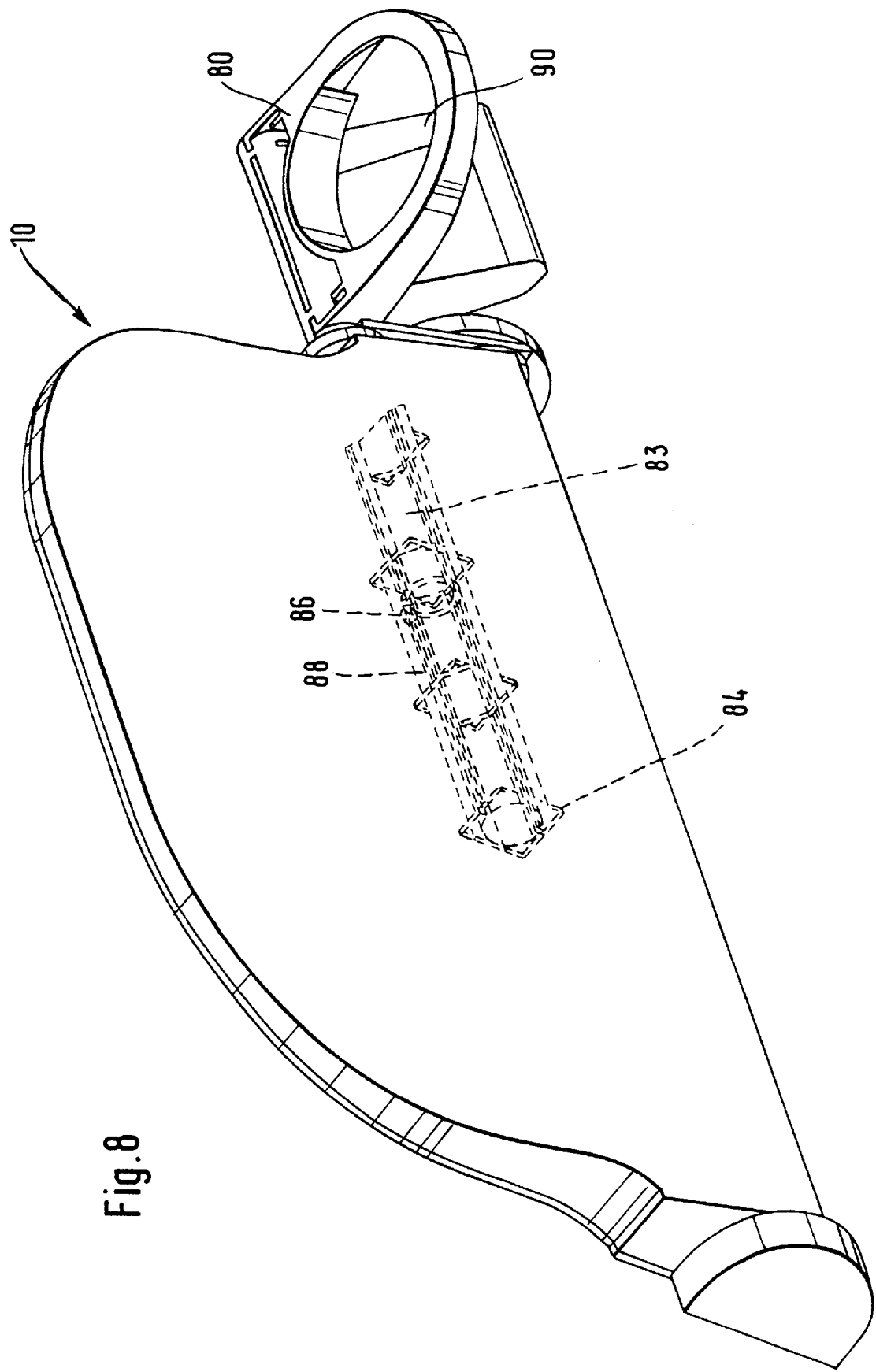
FIG. 8 shows the folding table of FIG. 6 in an out-of-use position.

FIGS. 7 and 8 show a second embodiment of a folding table 10 according to the invention in the in-use position (FIG. 7) and in the out-of-use position (FIG. 8). In this embodiment, a holder 80 in the form of a holding ring is fastened to the folding table 10 in such a manner that it can be pulled out of the folding table 10 at the side from a slot 82. For the purpose of pulling it out, the holder 80 has a slide rod 83 of circular cross-section which is integral with the holder 80 and is displaceably guided in rod holders 84 in the folding table 10. A nose 86 which projects radially from the slide rod 82 engages in a groove 88 in the folding table 10 extending in the longitudinal direction of the slide rod 82 and holds the holder 80 non-rotatably on the folding table 10. In order to be able to pivot the holder 80 relative to the folding table 10, the holder 80 is pulled out of the folding table 10 from the side beyond its in-use position shown in FIG. 6, as a result of which the nose 86 is released from the groove 88 and the holder 80 is pivotable. The holder 80 can then be pivoted to the underside of the folding table 10, so that, with the folding table 10 in the out-of-use position shown in FIG. 8, it assumes a horizontal in-use position. A support 90 is fastened to the holder 80. The support 90 is pivotally connected to the holder 80 by way of a pivot pin connection 92; it pivots downwards from the holder 80 by gravity and supports a drink container placed in the holder 80.

In other respects, the folding table 10 shown in FIGS. 7 and 8 corresponds with that shown in FIGS. 1 to 5 in terms of construction, and it functions in the same manner. In order to avoid repetition, reference is made in this connection to the comments made above with regard to FIGS. 1 to 5.

It will be understood that each of the elements described above, or two or more together, may also find a useful application in other types of constructions differing from the types described above.

While the invention has been illustrated and described as embodied in folding table for fitting to the rear side of the back of a seat in a motor-coach or an aircraft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A folding table for fitting a rear side of a back of a seat in a motor-coach or an aircraft, comprising a folding table element; pivotal articulation means formed so that said folding table element is pivotable back and forth between an out-of-use position in which said folding table element lyes substantially flat against a rear side of a back of a seat and an in-use position in which said folding table element projects approximately horizontally from said rear side of the back of the seat; a holder having an opening provided for holding a drink container and movably connected to said folding table element; a guide connecting said holder with said folding table element so that said holder, when said folding table element is in the in-use position is movable back and forth between an out-of-use position in which said holder is stowed in said holding table element, and an in-use position in which a drink container can be placed into said holder, said holder being provided with said guide formed so that said holder is movably connected to said folding table element so that said holder, when said folding table elements is in the out-of-use position, is movable back and forth between the out-of-use position and a second in-use position.

2. A folding table as defined in claim 1, wherein said holder is provided with said guide which is formed as a sliding guide such that said holder is fastened to said folding table element in a manner that it is movable out of said folding table element at one side.

3. A folding table as defined in claim 1, wherein said holder is provided with a pivotable articulation formed as a guide such that said holder is fastened to said holding table element so that it can be pivoted out of an upper side of said folding table element through a limited pivoting angle.

4. A folding table as defined in claim 1, wherein said holder has a support for supporting a drink container and being pivotal downwards from said holder through a limited pivoting angle by a pivoting articulation when said folding element table is in the out-of-use position and said holder is in the in-use position.

5. A folding table as defined in claim 1, and further comprising a safety mounting provided for said folding table element and having a stop which limits a pivoting angle of said folding table element in direction of the in-use position, said stop being surmountable by a limit-value load acting on said folding table element in direction of the in-use position being exceeded.

6. A folding table for fitting a rear side of a back of a seat in a motor-coach or an aircraft, comprising a folding table element; pivotal articulation means formed so that said folding table element is pivotable back and forth between an out-of-use position in which said folding table element lyes substantially flat against a rear side of a back of a seat and an in-use position in which said folding table element projects approximately horizontally from said rear side of the back of the seat; a holder provided for holding a drink container and movably connected to said folding table element; a guide connecting said holder with said folding table element so that said holder, when said folding table element is in the in-use position is movable back and forth between an out-of-use position in which said holder is stowed in said holding table element, and an in-use position in which a drink container can be placed into said holder, said holder having an opening spring element which is formed so that it pivots said holder into the in-use position, and said holder further having a releasable locking device which keeps said holder locked in the out-of-use position against a force of said opening spring element until it is released.

7. A folding table for fitting a rear side of a back of a seat in a motor-coach or an aircraft, comprising a folding table element; pivotal articulation means formed so that said folding table element is pivotable back and forth between an out-of-use position in which said folding table element lyes substantially flat against a rear side of a back of a seat and an in-use position in which said folding table element projects approximately horizontally from said rear side of the back of the seat; a holder provided for holding a drink container and movably connected to said folding table element; a guide connecting said holder with said folding table element so that said holder, when said folding table element is in the in-use position is movable back and forth between an out-of-use position in which said holder is stowed in said holding table element, and an in-use position in which a drink container can be placed into said holder, said holder having a support for supporting a drink container and being pivotal downwards from said holder through a limited pivoting angle by a pivoting articulation when said folding table element is in the out-of-use position and said holder is in the in-use-position, said support having a spring element which pivots said support downwards.

8. A folding table as defined in claim 7, wherein said spring element is formed as an opening spring element which pivots said support downwards.

9. A folding table for fitting a rear side of a back of a seat in a motor-coach or an aircraft, comprising a folding table element; pivotal articulation means formed so that said folding table element is pivotable back and forth between an out-of-use position in which said folding table element lyes substantially flat against a rear side of a back of a seat and an in-use position in which said folding table element projects approximately horizontally from said rear side of the back of the seat; a holder provided for holding a drink container and movably connected to said folding table element; a guide connecting said holder with said folding table element so that said holder, when said folding table element is in the in-use position is movable back and forth between an out-of-use position in which said holder is stowed in said holding table element, and an in-use position in which a drink container can be placed into said holder; and a safety mounting provided for said folding table element and having a stop which limits a pivoting angle of said folding table element in direction of the in-use position, said stop being surmountable by a limit-value load acting on said folding table element in direction of the in-use position being exceeded, said pivotal articulation of said folding table element includes pin about which said folding table element is pivotable back and forth between the out-of-use position and in-use position, said stop projecting from a periphery of said pivot pin; a sliding spring; and a slide which is pressed by said sliding spring against said pivot pin and with which said stop cooperates, said stop disengaging said slide if the limit-value load acting on said folding table element is exceeded.

10. A folding table for fitting a rear side of a back of a seat in a motor-coach or an aircraft, comprising a folding table element; pivotal articulation means formed so that said folding table element is pivotable back and forth between an out-of-use position in which said folding table element lyes substantially flat against a rear side of a back of a seat and an in-use position in which said folding table element projects approximately horizontally from said rear side of the back of the seat; a holder provided for holding a drink container and movably connected to said folding table element; a guide connecting said holder with said folding table element so that said holder, when said folding table element is in the in-use position is movable back and forth between an out-of-use position in which said holder is stowed in said holding table element, and an in-use position in which a drink container can be placed into said holder; and a mounting for mounting said folding table element on the rear side of the back of the seat; and an adaptor which is fastenable to said folding table element by an interlocking connection in a definite angular position relative to a pivotal axis of said pivotal articulation, said adaptor is fastenable to said mounting by an interlocking connection in a definite angular position.

11. A folding table as defined in claim 10, wherein said adaptor in an adaptor ring having an inner profile and an outer profile which produces the interlocking connection in a define angular projection.

* * * * *